(12) United States Patent
Morrison, Jr.

(10) Patent No.: US 11,964,332 B2
(45) Date of Patent: Apr. 23, 2024

(54) HOLE SAW ARBOR

(71) Applicant: Harry Omer Morrison, Jr., Duncannon, PA (US)

(72) Inventor: Harry Omer Morrison, Jr., Duncannon, PA (US)

(*) Notice: Subject to any disclaimer, the term of this patent is extended or adjusted under 35 U.S.C. 154(b) by 57 days.

(21) Appl. No.: 17/092,847

(22) Filed: Nov. 9, 2020

(65) Prior Publication Data

US 2021/0154750 A1  May 27, 2021

Related U.S. Application Data

(60) Provisional application No. 62/974,296, filed on Nov. 25, 2019.

(51) Int. Cl.
 *B23B 51/04* (2006.01)

(52) U.S. Cl.
 CPC ...... *B23B 51/0473* (2013.01); *B23B 51/0426* (2013.01); *B23B 51/0453* (2013.01); *B23B 51/044* (2013.01); *B23B 2231/0204* (2013.01); *B23B 2251/02* (2013.01); *B23B 2251/606* (2013.01); *B23B 2260/022* (2013.01); *B23B 2260/136* (2013.01)

(58) Field of Classification Search
 CPC ............ B23B 51/0473; B23B 51/0426; B23B 51/0453
 See application file for complete search history.

(56) References Cited

U.S. PATENT DOCUMENTS

| | | | | |
|---|---|---|---|---|
| 4,148,593 A * | 4/1979 | Clark | ............... | B23B 51/0473 408/206 |
| 5,076,741 A * | 12/1991 | Littlehorn | ........... | B23B 51/0453 408/703 |
| 5,082,403 A * | 1/1992 | Sutton | ................ | B23B 51/0453 408/209 |
| 6,341,925 B1 | 1/2002 | Despres | | |
| 2007/0166116 A1 | 7/2007 | Olson et al. | | |
| 2009/0226270 A1 | 9/2009 | Novak et al. | | |
| 2011/0027030 A1* | 2/2011 | Capstran | ............. | B23B 51/0453 408/204 |
| 2011/0177472 A1* | 7/2011 | Lee | .......................... | A61C 3/02 433/114 |

FOREIGN PATENT DOCUMENTS

WO  2004011179 A1  2/2004
WO  WO-2004011179 A1 *  2/2004  ............. B23B 31/11

OTHER PUBLICATIONS

"Notification of Transmittal of the International Search Report and the Written Opinion of the International Searching Authority" in PCT/US2020/060978, dated Mar. 25, 2021.

* cited by examiner

*Primary Examiner* — Eric A. Gates
*Assistant Examiner* — Reinaldo A Del Vargas Rio
(74) *Attorney, Agent, or Firm* — William H. Bollman (57) ABSTRACT

A hole saw arbor with mechanically automated plug removal to automatically remove the center plug of debris following drilling with the hole saw. A slidable collar is placed in an upper position on a threaded shaft to drill with the hole saw, and slid to a lower position on the threaded shaft for automated function of an ejection plate to rise within the hole saw to slowly eject a plug of removed material.

15 Claims, 10 Drawing Sheets

HOLE SAW ARBOR

The present application claims priority to U.S. Provisional No. 62/974,296, filed Nov. 25, 2019, the entirety of which is expressly incorporated herein by reference.

BACKGROUND OF THE INVENTION

1. Field of the Invention

The invention relates to powered tools, and in particular to a hole saw arbor.

2. Background of Related Art

Hole saws are known. While a drill may be used to create a relatively smaller hole in wood, plywood, particle board, PVC, plastic or other board or sheeting, a hole saw may be used to create larger holes. While a drill decimates the entire material inside the hole, a hole saw cuts a circle such that the center material is removed intact. To remove the center material the hole saw is then stopped, perhaps unplugged for safety if an electric drill, and then a screwdriver may be inserted in a slot or other opening on the side of the hole saw to work the removed center material out from inside the cylinder of the hole saw.

A hole saw generally comprises a hole saw of a selected diameter, and a hole saw arbor (also known as a hole saw mandrel). A hole saw arbor is the intermediate piece of a hole saw drill bit assembly that connects a hole saw to a drill chuck. Hole saw arbors are commercially available from, e.g., Milwaukee, Makita and DeWalt, etc., with chuck sizes typically of ¼", ⅜" or ½".

Figure 9:
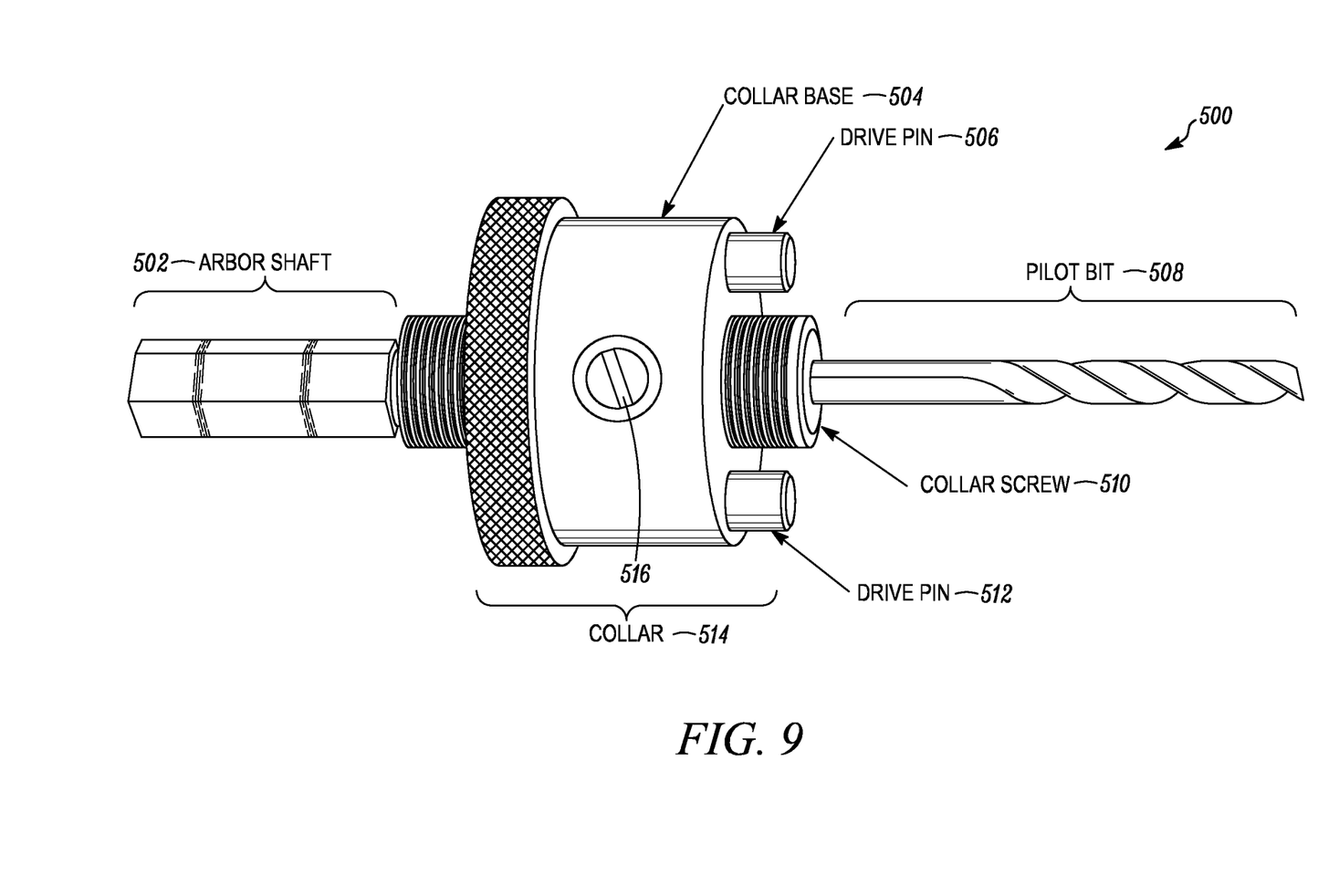
FIG. 9 shows a conventional hole saw arbor.

FIG. 9 shows a conventional hole saw arbor.

In particular, as shown in FIG. 9, the hole saw arbor 500 includes an arbor shaft (shank) 502 which affixes to a drill chuck (not shown). A collar 514 serves as the middle section of the hole saw arbor 500. A collar base 504 is the part of the collar 514 on which a hole saw (FIGS. 10A, 10B, 11) is attached. A collar screw 510 is positioned at the axial center of the collar base 504. A drill bit (pilot bit) 508 protrudes from the collar screw 510. A pair of drive pins 506, 512 are mounted in the collar 514 and attach to corresponding holes 712a, 712b in a hole saw 600 (FIG. 11). Additional locking mechanisms may be available in addition to, or in place of, the pair of drive pins 506, 512, to stabilize the hole saw. The present invention relates to any locking mechanism used to lock a hole saw to a collar 514.

Figure 10A:
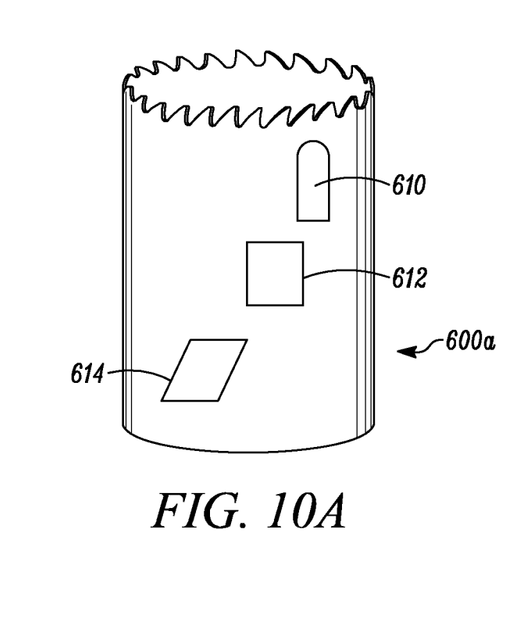
Figure 10B:
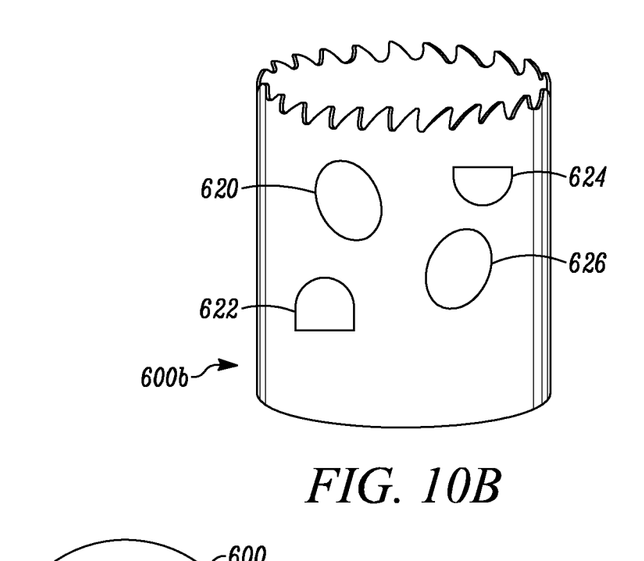
Figure 11:
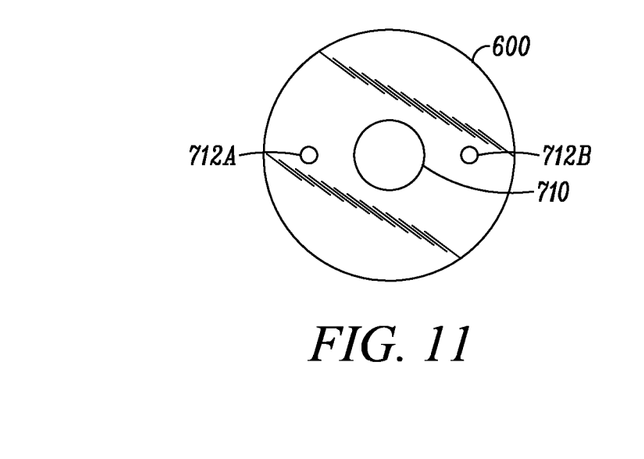
FIG. 11 shows the underside of a typical conventional hole saw.

FIGS. 10A and 10B show conventional hole saws with openings along the cylindrical wall for insertion of a screwdriver.

In particular, as shown in FIG. 10A, a given brand of a conventional hole saw 600a includes a series of openings 610-614 along the vertical cylindrical wall of the hole saw 600a. The intent of the openings 610-614 is to permit a user to insert the end of a screwdriver or other long instrument, and jam it into the side of the removed material that remains lodged in the hole saw 600a after drilling, then mechanically use the edge of the openings 610-614 for leverage to pry the removed material (not shown) from inside the hole saw 600a, thus permitting a subsequent use of the hole saw.

FIG. 10B shows a different brand of another conventional hole saw 600b with differently shaped, sized and positioned openings 620-626, albeit with the same purpose as the openings 610-614 in the hole saw 600a shown in FIG. 10A. That is, to permit the user easy access to the side of the removed circle material remaining lodged inside the hole saw 600b.

FIG. 11 shows the underside of a typical conventional hole saw.

In particular, FIG. 11 shows the underside of a typical conventional hole saw, including a center hole 710 (usually threaded, though quick release adapters are also in use). Drive holes 712a, 712b accept corresponding drive pins 506, 512 (FIG. 9) of a mating hole saw arbor 500.

Figure 5:
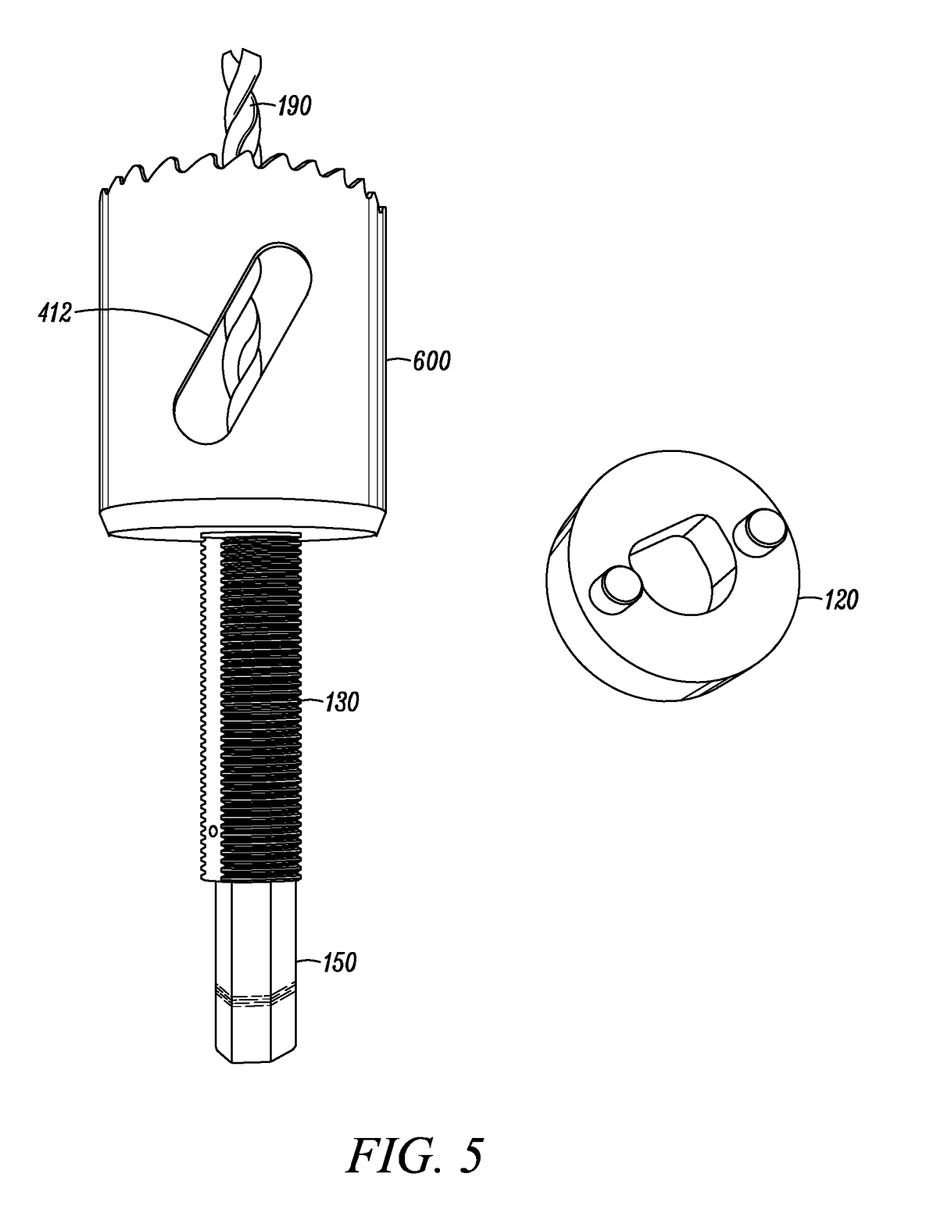
FIG. 5 shows the inventive hole saw arbor of FIG. 4 screwed through the center hole of an otherwise conventional hole saw such as shown in FIGS. 10A, 10B and 11.

Persons of ordinary skill in the art know of various types of conventional hole saws which are adapted for attachment to a conventional hole saw arbor 500 as shown in FIG. 5.

In particular, referring back to FIG. 9, the hole saw arbor 500 includes an arbor shaft 502 which in use is inserted into a drill chuck. The arbor shaft 502 (also known as a shank) extends to a collar 514. A collar base 504 includes a threaded collar screw 510 that protrudes from the axial center of the hole saw arbor 500. A drill bit 508 forming a pilot bit is inserted into an axial hole and secured from movement or rotation within the collar 514 using a set screw 516. The drill bit 508 extends farther from the collar than does the cutting end of a hole saw when mounted to the hole saw arbor 500, to provide a starting hole in the material to be cut.

The hole saw is affixed to the collar base 504 of the hole saw arbor 500 by threading the collar screw 510 through a center hole 710 in a base of a hole saw. Hole saws come in many sizes, typically from ½" to 15". Most (but not all) hole saw arbors 500 include drive pins 506, 512, typically two drive pins that match corresponding holes 712a, 712b in the base of the hole saw 600 mounted to the hole saw arbor 500. The drive pins 506, 512 help to stabilize the hole saw 600 with respect to the hole saw arbor 500.

Because a hole saw arbor 500 connects at its arbor shaft 502 end to a drill chuck, and at the other end to a hole saw 600 at the base of its collar 514. A hole saw arbor 500 has two points of compatibility among various brands of hole saw arbors: 1) the size (diameter) of the arbor shaft 502 must match the size (diameter) of the drill chuck; and 2) the thread size of the collar screw 510 must match the thread size of the hole saw 600.

Most hole saw arbors 500 are designed to fit "jaw type" drill chucks. Common chuck sizes include ¼", ⅜", and ½". Generally speaking, a larger drill chuck can accommodate larger bits and adapters at its working end. Some hole saw arbors 500 are made for Slotted Drive System (SDS) chuck systems. The chuck size partially reflects the power of the drill as well. For hole saws, drills with larger chucks can accept larger hole saws, and, generally, will be increasingly powerful to handle the workload of larger saws. Because of the way that jaw type chucks work (by closing around installed bits), larger chucks can also accept bits and adapters of smaller diameters. Drill chucks cannot accept bits and adapters with shanks larger than their chuck size. The present invention relates equally to all drill chuck sizes, and to all chuck systems.

Common diameters for the arbor shaft 502 of hole saw arbors 500 include ¼", ¹¹⁄₃₂", and ⁷⁄₁₆". Because the ¹¹⁄₃₂" and ⁷⁄₁₆" arbor shaft sizes are so close to their corresponding drill chuck sizes, e.g., the ⅜" and ½" drill chucks, some manufacturers use the rounded figures to describe hole saw arbors. Thus, the three common arbor shaft sizes are often referred to as ¼", ⅜", and ½". As the size of the chuck decreases, a chuck's compatibility options for sizes of the arbor shaft 502 decreases as well. Despite a chuck's ability to hold an arbor shaft 502 of a smaller diameter, it is always best to match the size of the arbor shaft 502 to the size of the chuck whenever possible.

Hole saw arbors 500 are conventionally available with arbor shafts 502 in four major styles: round, flats, hex, and slotted drive system (SDS). Round, flats, and hex arbor shafts 502 are intended for use with jaw type drill chucks. The various designs offer different degrees of resistance to slippage in a jaw type chuck. Arbor shafts 502 with an SDS shank is specifically for SDS systems and are not compatible with any other type of chuck. The present invention relates to arbor shafts 502 of all type styles.

Common sizes for the threaded collar screw 510 are ½"-20 tpi (threads per inch) and ⅝"-18 tpi (threads per inch). The present invention relates to all matched thread sizes between a hole saw and a collar screw 510.

Generally speaking, ⅝"-18 thread hole saws are of relatively larger diameter than the ½"-20 because the thread size of the hole saw corresponds to the thread size of the hole saw arbor 500. Hole saw arbors 500 with a ¼" arbor shaft diameter are currently only available in ½"-20 thread sizes, which in turn determines the range of compatible hole saw diameter sizes. Hole saws with a center threaded hole of ¼" tend to be compatible with the smallest cutting diameter hole saws. Hole saws with a center threaded hole of ½" tend to be larger, and hole saws with a center threaded hole of ⅝" tend to be the largest, e.g., up to 6" diameter cut or larger. Thus, compatible hole saws are dictated by the diameter and thread of the center hole matching the same of the collar screw 510 and collar 514 of the hole saw arbor 500. The present invention relates to all size hole saws, with any size threaded center hole, and with any size collar screw 510.

An arbor shaft extension may be used to lengthen the reach of the hole saw arbor 500.

Some conventional hole saw arbors 500 utilize a quick change capability between the hole saw and the collar 514. The present invention is applicable to quick change hole saw arbors.

Specialized hole saw arbor designs are available that guide the re-drilling of an existing hole (e.g., a mistake) to a larger diameter. The present invention is applicable to hole saw arbors 500 including a guide for re-drilling a hole.

A conventional hole saw completes the circular hole by removing a circle of wood (or other material) but leaves it to the user to physically remove the removed circle of material from the inside of the hole saw. The conventional task of manual removal of lodged debris from inside the cylinder of a hole saw slows a job down, requiring additional time to perform a given drilling task.

There is a need for a simpler mechanism to remove a jammed circle of removed material remaining lodged inside the cylinder of the hole saw after drilling, particularly for use by a professional who may have the task of drilling many holes in rapid sequence.

There is also a need for an automated mechanism for removal of the jammed circle of removed material left lodged inside the cylinder of a hole saw.

SUMMARY OF THE INVENTION

A hole saw arbor in accordance with a first aspect of the invention comprises a threaded shaft. A slidable collar is adapted to slide along the threaded shaft without rotation. An ejector is mounted to a first end of the threaded shaft, and a non-threaded shaft at a second end of the threaded shaft opposite the first end. The slidable collar is adapted to secure a hole saw for rotation with the threaded shaft.

A hole saw in accordance with another aspect of the invention comprises a hole saw and a hole saw arbor. The hole saw arbor comprises a threaded shaft, and a slidable collar adapted to slide along the threaded shaft without rotation. A mechanical feature such as an ejector or a smaller hole saw is mounted to a first end of the threaded shaft, and a non-threaded shaft at a second end of the threaded shaft opposite the first end. The slidable collar is adapted to secure a hole saw for rotation with the threaded shaft.

A method of mechanically ejecting a plug of removed material from inside a hole saw after drilling comprises sliding a slidable collar from an upper drilling position where the slidable collar is mated to the base of a hole saw, to a lower ejection position where the slidable collar is slid away from the base of the hole saw. The hole saw is held from rotation with rotation of a power drill, and the shaft of the hole saw arbor is power rotated to move an ejector from a first drilling position within the hole saw, to a second ejection position wherein the ejector moves toward a cutting edge of the hole saw.

BRIEF DESCRIPTION OF THE DRAWINGS

Features and advantages of the present invention will become apparent to those skilled in the art from the following description with reference to the drawings, in which:

FIGS. 10A and 1BB show conventional hole saws with openings along the cylindrical wall for insertion of a screwdriver.

DETAILED DESCRIPTION OF ILLUSTRATIVE EMBODIMENTS

The present invention provides a hole saw arbor with mechanically automated plug removal to automatically remove the center plug of debris following drilling with the hole saw. Ordinarily, the discarded plug can be very difficult to remove, particularly when cutting a hole in a porous material such as wood, particle board, or when cutting a hole in a material which may expand or become sticky with the heat created by the cut making removal of the plug difficult. Plastic circles removed by a hole saw can be particularly problematic as the plastic can melt and expand from the cut and become solidly lodged within the hole saw.

When using a conventional hole saw, a common problem is the inability to easily remove the cut plug of material remaining in the hole saw following drilling. A hole saw arbor in accordance with the present invention allows for easy removal of a plug and/or other debris contained within the hole saw after use.

In disclosed embodiments the hole saw arbor is designed to fit all standard-sized hole saws, e.g., from ½" diameter hole saws through 6" diameter hole saws, and all sizes in between.

A hole saw arbor in accordance with the invention allows a removed plug to be easily and quickly removed from the hole saw, with minimal effort.

Figure 1:
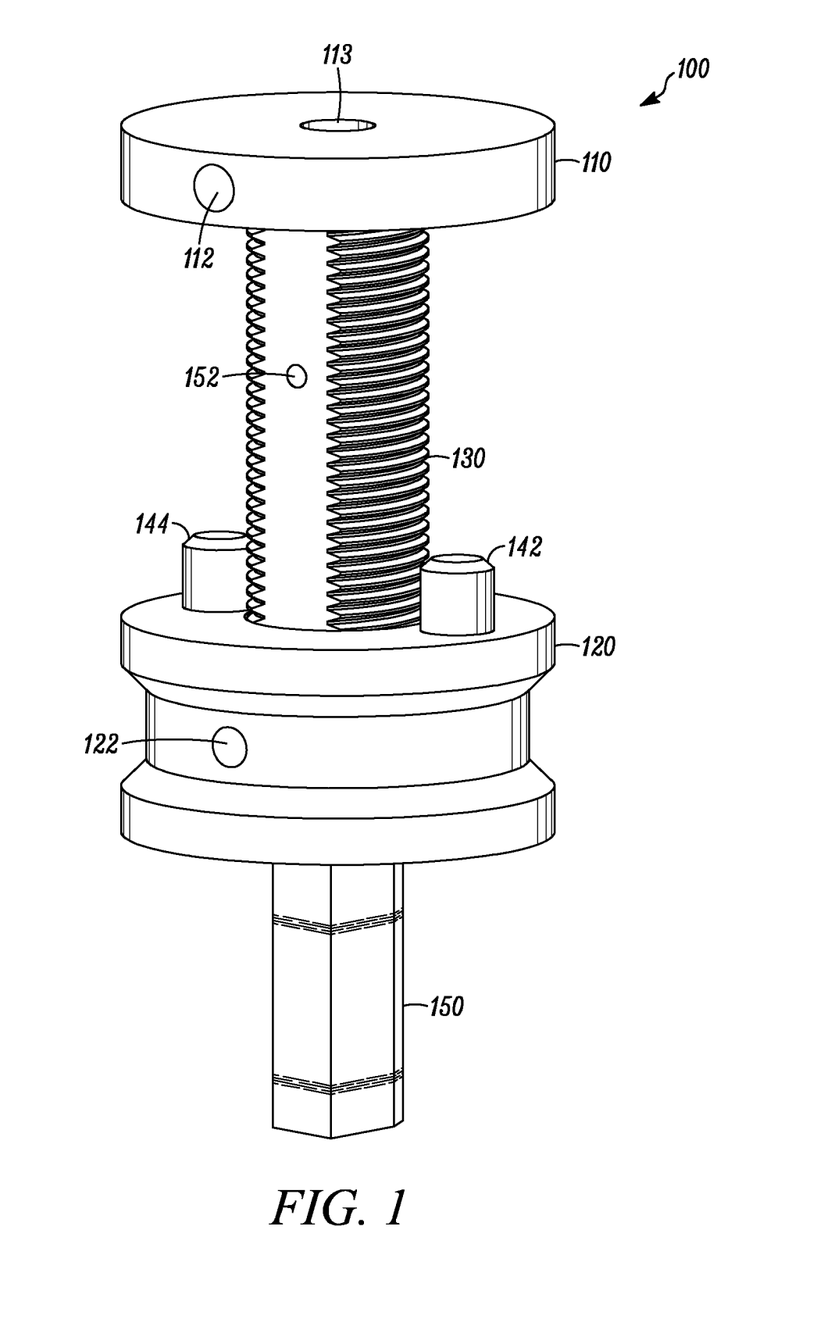
FIG. 1 shows an exemplary hole saw arbor, in accordance with principles of one aspect of the present invention.

FIG. 1 shows an exemplary hole saw arbor, in accordance with principles of one aspect of the present invention.

In particular, as shown in FIG. 1, an exemplary hole saw arbor 100 includes a drive lock slidable collar 120 and threaded D-shaft 130 over which the slidable collar 120 slides.

Importantly, at one end of the threaded D-shaft 130 is an ejector 110. The ejector includes a center hole to accommodate a pilot drill, held in place by a set screw. The ejector may have any diameter, preferably smaller than a smallest size hole saw with which the hole saw arbor 100 is to be used. In given embodiments the ejector 110 is 1.5" in diameter. It is also possible, though not necessary, that the ejector have a much larger diameter for use with larger diameter hole saws (e.g., 6" diameter hole saws).

The threaded D-shaft 130 in the disclosed examples is a ⅝" threaded shaft. Other diameters, and/or thread counts, are within the principles of the present invention. The flat surface may flatten, e.g., 1/16" of an otherwise rounded shaft.

In the disclosed embodiments the ejector 110 is a circular plate mounted to the end of the threaded D-shaft 130 held in place by an appropriate set screw 112. The threaded D-shaft 130 accommodates the butt end of a pilot drill 190 passed through a hole 113 in the ejector 110, held in place by a set screw 112.

The threaded D-shaft 130 may be a threaded round shaft with a groove or other mechanism to maintain the slidable collar 120 from rotating on the threaded D-shaft when in a drilling position.

The ejector 110 may be of a shape other than planar. For instance, the ejector 110 may be a ball mounted to the end of the threaded shaft 130.

The slidable collar 120 includes at least one drive pin 142, 144. The drive pins 142, 144 preferably follow standardized size and positions of conventional drive pins to mate with a conventional hole saw 600. The slidable collar 120 has a diameter of 1.5" in disclosed embodiments, though any diameter slidable collar 120 is within the principles of the present invention.

Importantly, the slidable collar 120 moves up and down the threaded D-shaft 130 without rotation in the threads of the threaded D-shaft.

The slidable collar 120 includes a slidable detent ball against the flat side of the threaded D-shaft 130, held in place by a set screw 127, spring 128 and ball 129 in a radial shaft 122.

The slidable collar 120 is preferably, though not necessarily, shaped to be gripped easily to push up and down the threaded D-shaft 130. For instance, in the disclosed embodiments, the middle section of the slidable collar 120 has a reduced diameter with respect to upper and lower sections of the slidable collar 120.

The circumferential surfaces may be knurled, particularly the upper and lower sections of the slidable collar 120.

The slidable collar 120 is shown in a first or lower detent position. FIG. 1 shows the hole saw arbor 100 as it may be seen when a hole saw 600 is not mounted to the hole saw arbor. To mount a hole saw 600, the slidable collar 120 is removed entirely from the threaded shaft 130 and shaft 150 and placed aside as the shaft 150 is inserted into a hole saw 600 so that the hole saw 600 is able to be threaded on the threaded shaft 130. As shown in FIG. 1, the slidable collar 120 may be slid freely up and down the threaded D-shaft 130.

Figure 2:
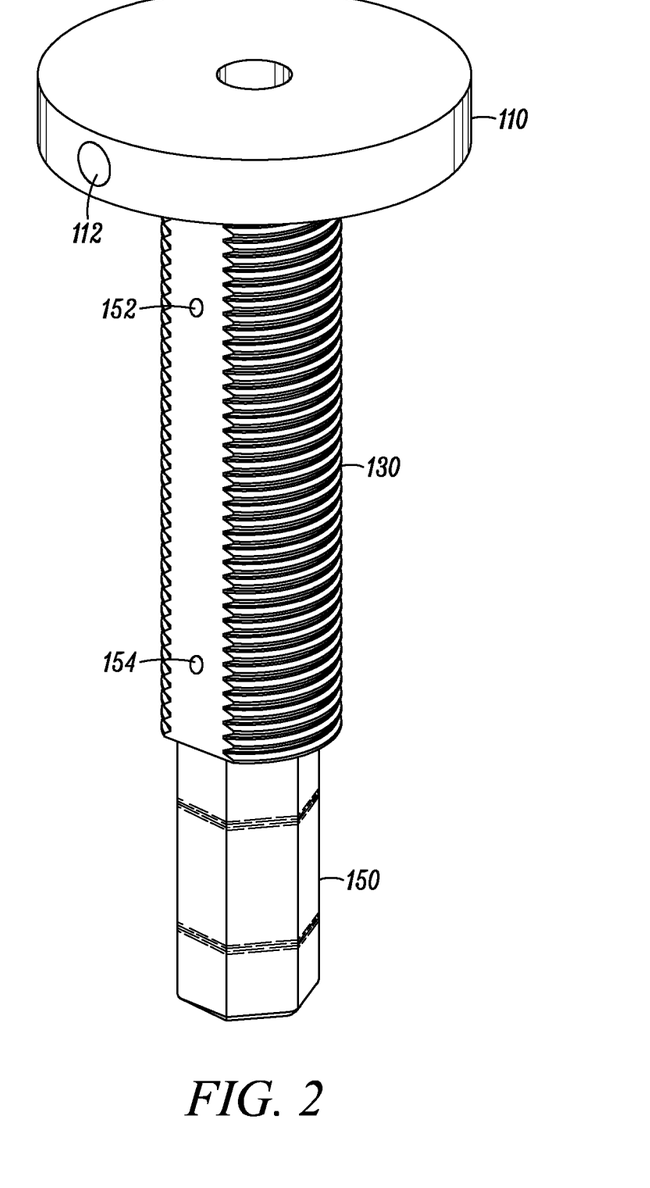
FIG. 2 shows an arbor shaft with an extended threaded portion and an ejector plate at a top end, in accordance with the principles of the present invention.

FIG. 2 shows an arbor shaft with an extended threaded portion and an ejector plate at a top end, in accordance with the principles of the present invention.

As shown in FIG. 2, the threaded shaft 130 ends at one end in the shaft. Preferably the shaft 150 is formed on the threaded shaft 130, though the present invention relates equally to a shaft 150 mated to a threaded shaft 130 in a way in which rotation therebetween is prevented. In the exemplary embodiment, the 6-sided hex-shaped shaft 150 is a 7/16" hex as measured in cross section from flat surface to flat surface. Other cross-sectional shaped shafts 150 are possible and within the principles of the present invention. For instance, an 8-sided shaft 150 is possible, as is a 4-sided shaft, or a round shaft 150.

Figure 3A:
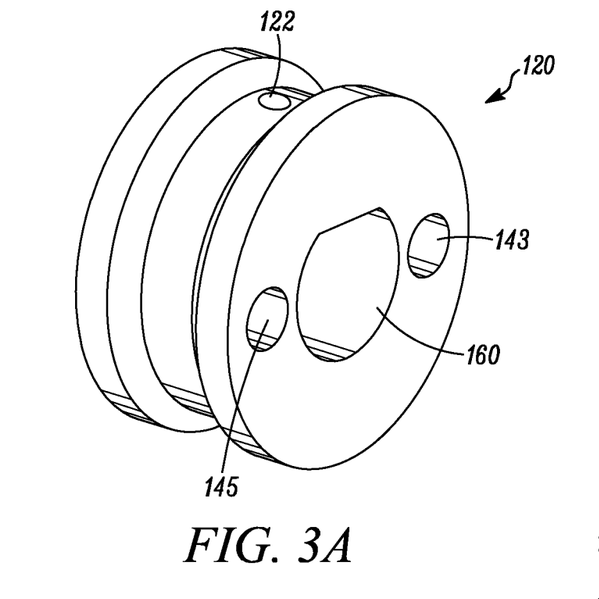
FIGS. 3A and 3B show a slide collar which engages the hole saw, in accordance with principles of the present invention.
Figure 3B:
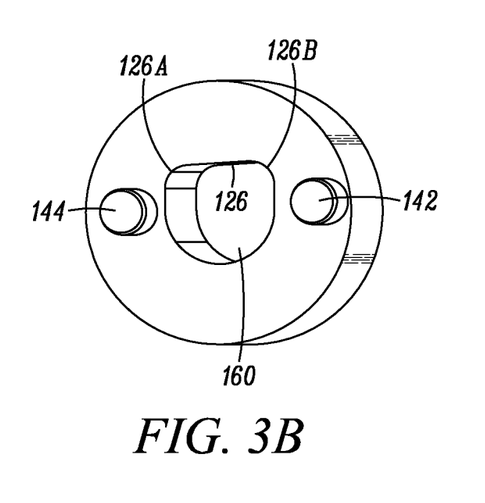

FIGS. 3A and 3B show a slidable collar 120 which engages a hole saw 600, in accordance with principles of the present invention.

In the disclosed embodiments the drive pins 142, 144 are inserted into blind holes made in the slidable collar 120. However, the drive pins 142, 144 may be formed or machined into the slidable collar 120 when the slidable collar 120 is manufactured.

FIG. 3B shows the D-hole 160 in the center of the slidable collar 120 which accommodates the threaded D-shaft 130.

The corners 126a, 126b of the D-hole 160 may be slightly enlarged, or 'relieved', to allow for free slide of the slidable collar 120 without brushing up against an edge of the thread on both edges of the flat sides of the threaded D-shaft 130.

Figure 3C:
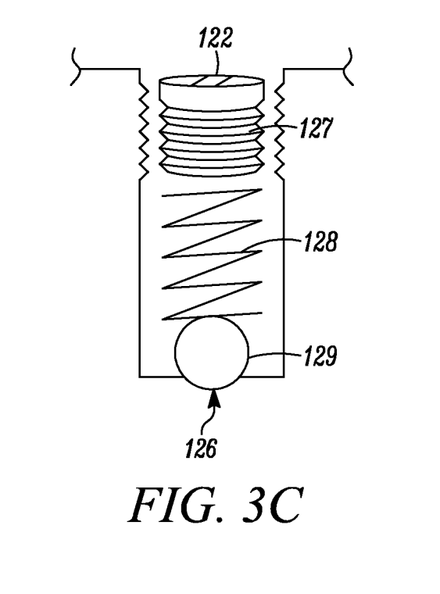
FIG. 3C shows a cutaway view of a spring ball detent in the slide collar, in accordance with the principles of the present invention.

FIG. 3C shows a cutaway view of a spring ball detent in the slide collar, in accordance with the principles of the present invention.

The slidable collar 120 includes a detent 126 (FIGS. 3B and 3C) formed by a ball inserted into a radial shaft 122. A spring 128 biases the ball 129 against a small circular opening at the bottom of the radial shaft 122 which exposes the ball 129 to contact the flat side of the threaded D-shaft 130 to form a sliding detent 126. The sliding detent 126 holds the slidable collar 120 in place at the lower detent position 154 on the threaded D-shaft 130, or in place at the upper detent position 152 on the threaded D-shaft 130.

The disclosed embodiments of the threaded D-shaft 130 has two detents: the upper detent 152 and a lower detent 154. The invention is equally applicable with use of many more detents between the upper detent 152 and the lower detent 154.

Figure 4:
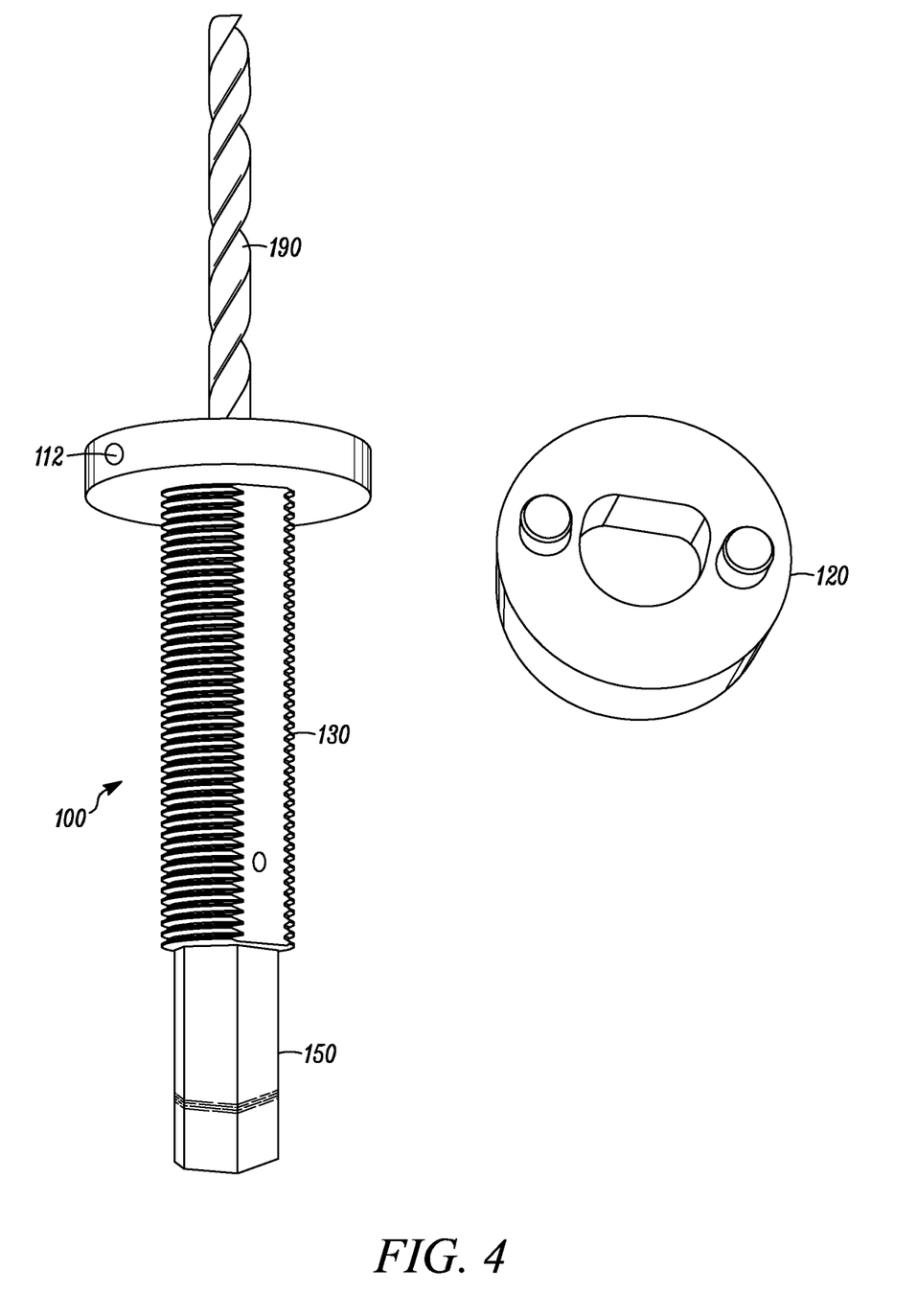
FIG. 4 shows a hole saw arbor with a pilot drill mounted and ready for mounting by a hole saw, in accordance with an embodiment of the present invention.

FIG. 4 shows a hole saw arbor 100 with a pilot drill 190 mounted and ready for mounting by a hole saw, in accordance with an embodiment of the present invention.

In particular, FIG. 4 shows an initial step in assembling the hole saw arbor 100 and selected hole saw 600, including the automated ejector. The assembly process begins with separation of the slidable collar 120 from the threaded D-shaft 130 and shaft 150.

The hole saw is connected to the hole saw arbor 100 by removing the slidable collar 120, threading a selected diameter hole saw 600 onto the arbor 100 until the slidable collar 120 and locked into place by insertion of the drive pins 142, 144 into the associated holes 712a, 712b in the base of the hole saw 600.

FIG. 5 shows the inventive hole saw arbor of FIG. 4 screwed through the center hole of an otherwise conventional hole saw 600 such as shown in FIGS. 10A, 10B and 11.

The shaft 150 is passed through the center hole 710 of the hole saw 600, and the hole saw 600 is rotated so that it is threaded onto the threaded D-shaft 130.

The hole saw 600 may be, but need not be threaded all the way onto the threaded D-shaft 130 such that the base of the hole saw contacts the ejector 110 at the end of the threaded D-shaft. Threaded all the way onto the threaded D-shaft 130 permits drilling by the hole saw of materials nearly as thick as the hole saw is tall (less the thickness of the ejector 110).

The ejector 110 may be positioned at a particular depth within the cylinder of the hole saw 600 to provide a setting for a depth of cut. For instance, by threading the hole saw arbor 100 into the hole saw 600 such that the ejector 110 is ½" from the cutting edge of the hole saw, the hole saw will be prevented from drilling a hole deeper than ½" before the ejector 110 contacts a surface of the material being cut.

In operation, the hole saw arbor 100 is inserted into a drill chuck and the power drill is slowly activated in a forward (clockwise) direction. The ejector 110 is rotated along with the threaded D-shaft 130 until it comes in contact with the waste piece plugged in the hole saw 600. The power drill is continued in a forward direction, turning the ejector 110 along the top of the threaded D-shaft 130 until the waste material is dislodged and removed from the interior of the hole saw 600. Once the waste material is removed from the interior of the hole saw 600, the power drill may be operated slowly in the opposite direction (i.e., counter-clockwise) to return the ejector 110 to a start position. At this point the slidable collar 120 may be slid up on the threaded D-shaft 130 to the upper detent position 152, locking the hole saw 600 in place on the hole saw arbor 100, ready for its next use.

The start position of the ejector 110 may be all the way down to the base of the hole saw 600, or may be a position somewhere above the base of the hole saw 600, e.g., to provide a depth-of-cut setting for the hole saw 600.

It is within the principles of the present invention to have the ejector 110 mounted to the top of the threaded D-shaft 130 such that the threaded D-shaft 130 would continue to freely rotate while the ejector 110 may stop rotating once it comes in contact with the plug of material in the hole saw.

Figure 6A:
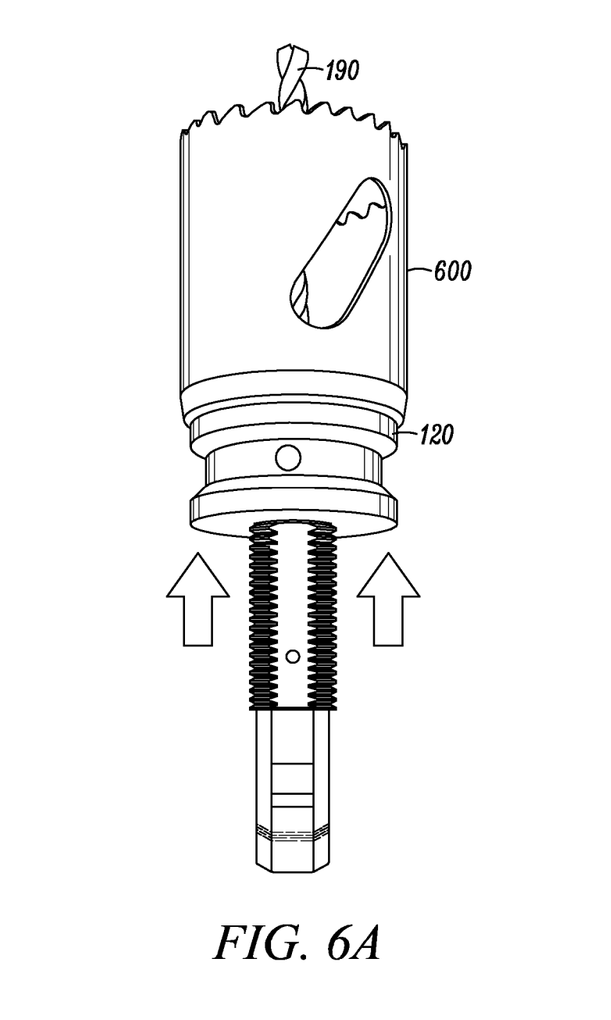
FIGS. 6A and 6B show a drilling configuration of the hole saw arbor, in accordance with the principles of the present invention.
Figure 6B:
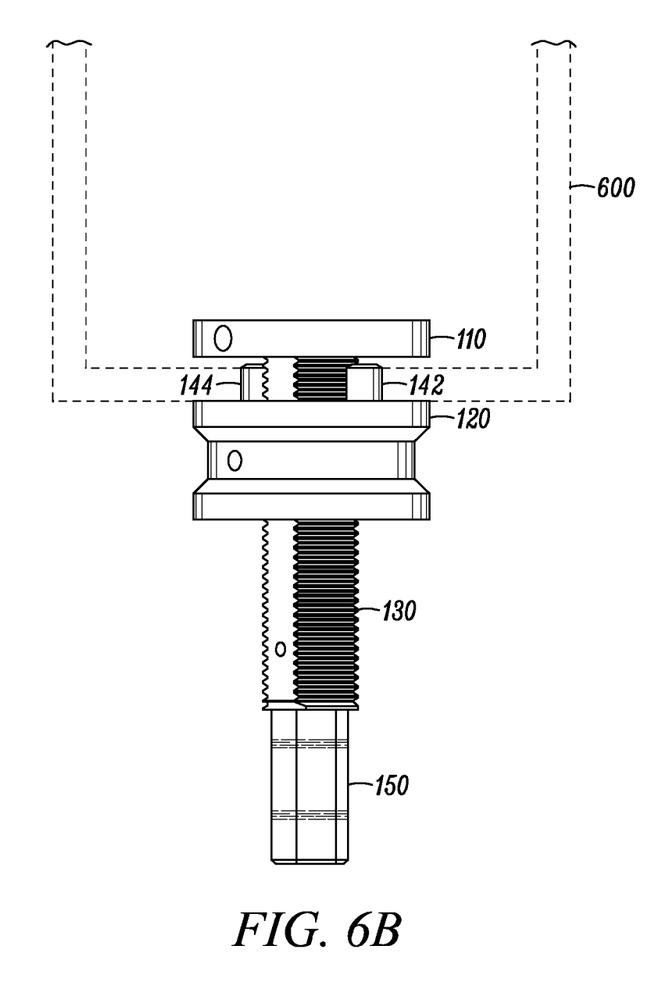

FIGS. 6A and 6B show a drilling configuration of the hole saw arbor, in accordance with the principles of the present invention.

In particular, the drilling configuration is obtained by placing the slidable collar 120 over the shaft 150 and onto the threaded D-shaft 130 until the studs, or drive pins 142, 144, engage into the drive holes 712a, 712b on the bottom of the hole saw 600.

This is the drilling configuration of the hole saw arbor 100 with hole saw 600 installed. To drill with the hole saw 600 the shaft 150 of the hole saw arbor 100 is installed in a drill chuck, and then used to drill a hole in a material.

FIG. 6B is a partial cut-away view intended to show the configuration of the slidable collar 120 against the base of the hole saw 600.

Figure 7:
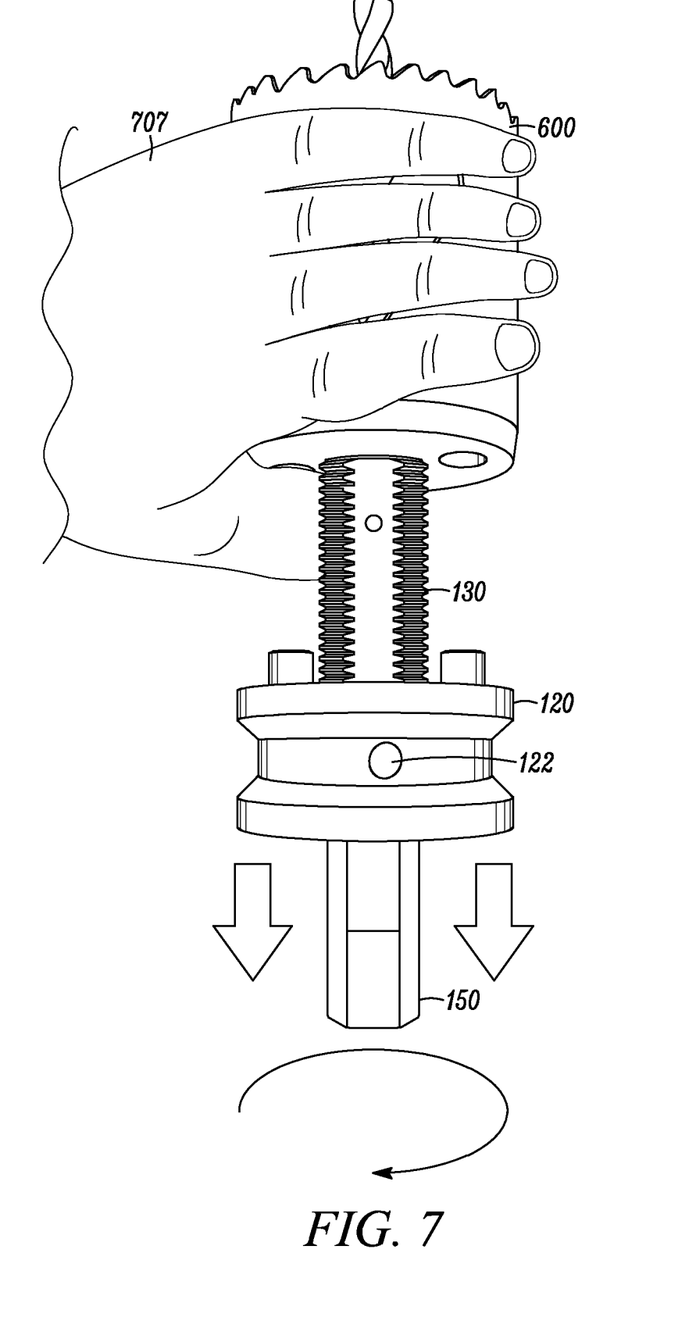
FIG. 7 shows the hole saw arbor in an automated removal configuration wherein the slide collar is positioned above the second detent in the threaded shaft; the hole saw is held from rotation by a user's hand; and the power drill is used to turn the arbor shaft clockwise such that the ejector plate rises within the hole saw and mechanically presses the removed material from inside the cylinder of the hole saw, in accordance with the principles of the present invention.

FIG. 7 shows the hole saw arbor 100 in an automated ejection configuration wherein the slidable collar 120 is positioned along the threaded D-shaft 130 above the upper detent 152 in the flat side of the threaded D-shaft 130. The hole saw 600 is held from rotation by a user's hand 700. The power drill is used then slowly powered to turn the arbor shaft 150 clockwise such that the ejector 110 rises on the top of the threaded D-shaft 130 within the hole saw 600 and mechanically presses the discarded, removed material that was cut but which remains lodged as a plug inside the cylinder of the hole saw 600, in accordance with the principles of the present invention.

For plug removal, the slidable collar 120 is pulled down the threaded D-shaft 130 toward the drill chuck to a lower position marked by the lower detent 154, where the lodged plug of removed material may be easily, automatically and mechanically ejected from the inside of the hole saw by power of the drill itself.

When ejecting the plug of removed material, the power drill may be run clockwise with the power drill on a slow forward speed while holding the hole saw 600 from rotation by grip of a gloved hand of the user. The ejector 110 is preferably raised within the hole saw 600 until the plug of debris is automatically ejected from the hole saw 600.

The drill can then be reversed to return the hole saw arbor 100 back to the drilling position. In particular, once the plug of removed material has been ejected, the drill can be run in reverse (counter-clockwise) so that the threaded D-shaft 130 pulls in the direction of out of the bottom of the hole saw 600, allowing the ejector 110 to return to the lowest position within the hole saw 600 (or to another position within the hole saw 600 so as to provide a depth of cut setting.

Figure 8A:
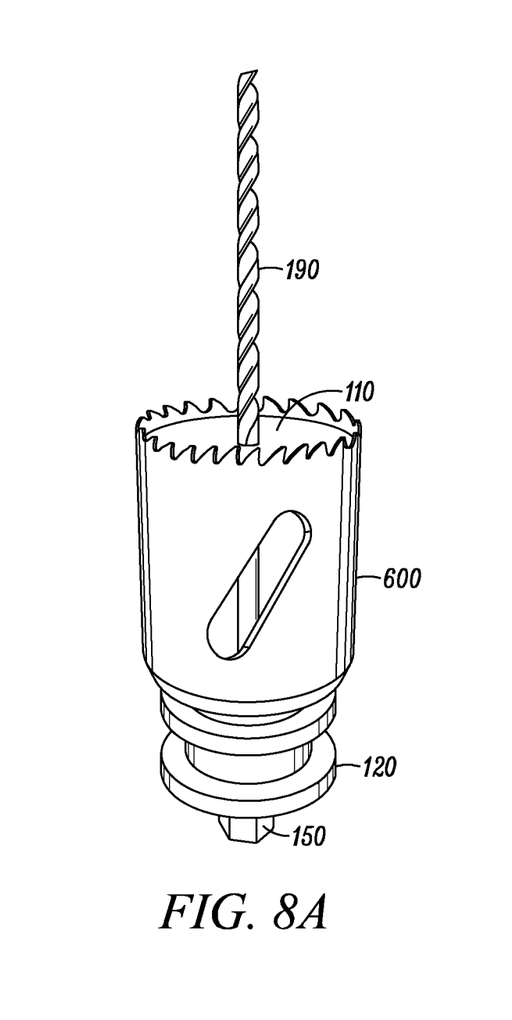
FIGS. 8A and 8B show the ejector plate in a position near a cutting plane of the hole saw, in accordance with the principles of the present invention.
Figure 8B:
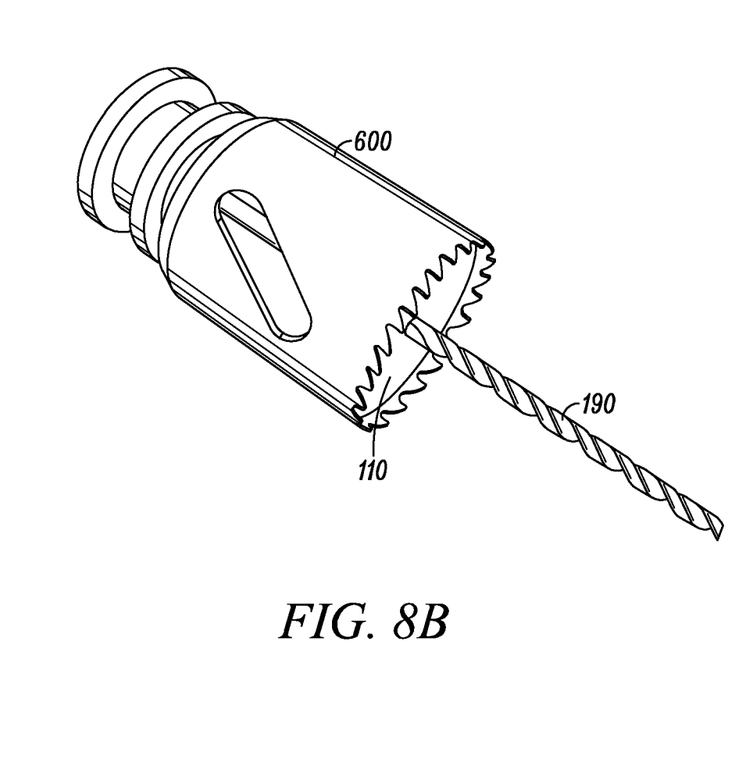

FIGS. 8A and 8B show the ejector 110 in a position near a cutting plane of the hole saw 600 to serve as a depth-of-cut setting, in accordance with the principles of the present invention.

In particular, as shown in FIGS. 8A and 8B, the ejector 110 is placed at a particular distance from the cutting edge of the hole saw 600 to prevent drilling of a material any deeper than the particular distance. The hole saw arbor 100 can then be used to drill with the ejector 110 in the depth-of-cut position to form a depth-of-cut setting.

Use of a hole saw arbor with a mechanically automated ejector 110 eliminates the need for openings 412 in the cylindrical wall of conventional hole saws 600, thus simplifying manufacture and reducing costs of hole saws. Elimination of openings 412 in the cylindrical wall of a hole saw also makes the hole saw 600 structurally stronger.

It is within the principles of the invention to replace the ejector 110 on the end of the threaded D-shaft 130 with another feature that is raised and lowered within the hole saw 600. For instance, a smaller hole saw (not shown) may be mounted to the top of the threaded D-shaft 130 in place of the ejector 110 to provide two different diameters for drilling, either simultaneously or in sequence.

The above Detailed Description of embodiments is not intended to be exhaustive or to limit the disclosure to the precise form disclosed above. While specific embodiments of, and examples are described above for illustrative purposes, various equivalent modifications are possible within the scope of the system, as those skilled in the art will recognize. For example, while processes or blocks may be presented in a given order, alternative embodiments may perform routines having operations, or employ systems having blocks, in a different order, and some processes or blocks may be deleted, moved, added, subdivided, combined, and/or modified. While processes or blocks are at times shown as being performed in series, these processes or blocks may instead be performed in parallel or may be performed at different times. Further, any specific numbers noted herein are only examples; alternative implementations may employ differing values or ranges.

REFERENCE NUMERALS AS USED HEREIN ARE TABULATED BELOW FOR CONVENIENCE 100 hole saw arbor
110 ejector
112 set screw
113 center hole
120 slidable collar (drive lock)
122 radial shaft
126 detent slider
127 set screw
128 spring
129 ball
130 threaded D-shaft
142 drive pin
143 drive pin hole
144 drive pin
145 drive pin hole
150 shaft
152 upper detent
154 lower detent
160 D-hole
190 drill
412 opening
600 hole saw
707 hand While the invention has been described with reference to the exemplary embodiments thereof, those skilled in the art will be able to make various modifications to the described embodiments of the invention without departing from the true spirit and scope of the invention.

What is claimed is:

1. A hole saw arbor comprising:
a threaded shaft;
a non-rotatable slidable collar adapted to slide without rotation axially over an outside of threads of the threaded shaft without rotation;
an ejector mounted to a first end of the threaded shaft; and
a non-threaded shaft at a second end of the threaded shaft opposite the first end, wherein
the threaded shaft has at least one detent in a threaded portion on a flat side of the threaded shaft to hand-coerce a spring-loaded protrusion mounted in the non-rotatable slidable collar into a pre-set drilling position along the threaded shaft, whereby a hole saw is adapted to rotate on the threaded shaft over and beyond the at least one detent toward the second end of the threaded shaft, and
the non-rotatable slidable collar is adapted to hand-secure the hole saw for rotation with the threaded shaft, the non-rotatable slidable collar having a singular flat, planar surface parallel to a base of the hole saw for mating there against, the singular flat, planar surface extending 360 degrees around a full circumference of the threaded shaft.

2. The hole saw arbor according to claim 1, wherein:
the non-threaded shaft has a hex-shaped cross-sectional shape.

3. The hole saw arbor according to claim 1, wherein:
the non-threaded shaft has a circular cross sectional shape.

4. The hole saw arbor according to claim 1, wherein:
the threaded shaft is a grooveless, one-flat-sided threaded shaft.

5. The hole saw arbor according to claim 4, wherein:
the at least one detent is formed in a radial direction into the flat side of the threaded shaft.

6. The hole saw arbor according to claim 4, wherein:
the threaded shaft has at least two detent positions on the flat side of the threaded shaft to secure the non-rotatable slidable collar either in the drilling position or in an ejection position.

7. The hole saw arbor according to claim 1, further comprising:
at least two studs on the singular flat, planar surface of the non-rotatable slidable collar for penetration into the base of the hole saw in the drilling position to secure the hole saw for rotation with the threaded shaft.

8. The hole saw arbor according to claim 1, wherein:
the threaded shaft has a plurality of the detents on the flat side of the threaded shaft for securing the non-rotatable slidable collar in drilling positions.

9. A hole saw system comprising:
a hole saw; and
a hole saw arbor comprising:
a threaded shaft;
a non-rotatable slidable collar adapted to slide without rotation axially over an outside of threads of the threaded shaft without rotation;
a mechanical feature mounted to a first end of the threaded shaft; and
a non-threaded shaft at a second end of the threaded shaft opposite the first end, wherein
the threaded shaft has at least one detent in a threaded portion on a flat side of the threaded shaft to hand-coerce a spring-loaded protrusion mounted in the non-rotatable slidable collar into a pre-set drilling position along the threaded shaft, whereby the hole saw is adapted to rotate on the threaded shaft over and beyond the at least one detent toward the second end of the threaded shaft, and
the non-rotatable slidable collar is adapted to hand-secure the hole saw for rotation with the threaded shaft, the non-rotatable slidable collar having a singular flat, planar surface parallel to a base of the hole saw for mating there against, the singular flat, planar surface extending 360 degrees around a full circumference of the threaded shaft.

10. The hole saw system according to claim 9, wherein:
the non-threaded shaft has a hex-shaped cross-sectional shape.

11. The hole saw system according to claim 9, wherein:
the threaded shaft is a grooveless, one-flat-sided threaded shaft.

12. The hole saw system according to claim 9, wherein:
the at least one detent is formed in a radial direction into the flat side of the threaded shaft.

13. The hole saw system according to claim 9, wherein:
the threaded shaft has at least two detent positions on the flat side of the threaded shaft to secure the non-rotatable slidable collar either in the drilling position or in an ejection position.

14. The hole saw system according to claim 9, wherein:
the mechanical feature is an ejector.

15. The hole saw according to claim 9, wherein:
the mechanical feature is another hole saw with a smaller diameter than the hole saw.

* * * * *